A. G. PAUL.
THERMOSTATIC VALVE.
APPLICATION FILED FEB. 27, 1896.

No. 903,310.

Patented Nov. 10, 1908.

WITNESSES:

INVENTOR
Andrew G. Paul
BY
Witter & Kenyon
ATTORNEYS

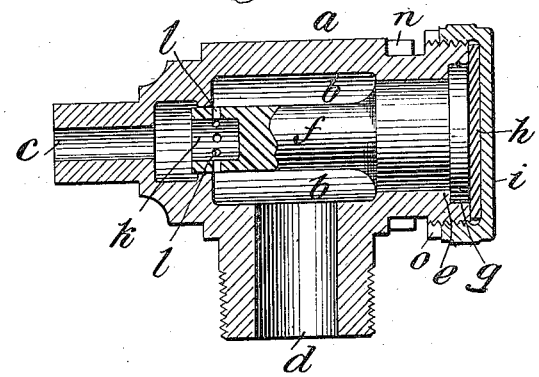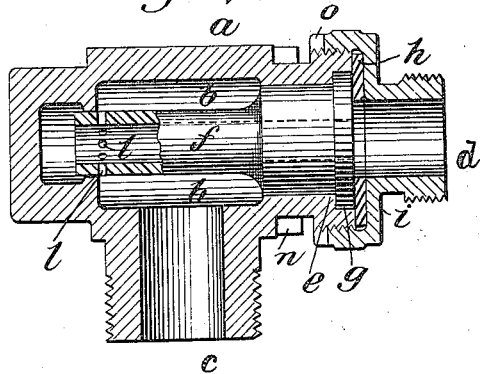

UNITED STATES PATENT OFFICE.

ANDREW G. PAUL, OF BOSTON, MASSACHUSETTS.

THERMOSTATIC VALVE.

No. 903,310.  Specification of Letters Patent.  Patented Nov. 10, 1908.

Application filed February 27, 1896. Serial No. 581,024.

*To all whom it may concern:*

Be it known that I, ANDREW G. PAUL, a citizen of the United States, residing in the city of Boston, county of Suffolk, and State of Massachusetts, have invented a new and useful Improvement in Thermostatic Valves, of which the following is a full, clear, and exact specification, reference being had to the accompanying drawings, which form a part hereof.

My invention relates to valves which are adapted to be opened and closed by the effect of heat or cold, such as are commonly known as thermostatic valves, and it is especially adapted for use upon the air pipe of a steam heating system such as is shown in United States Letters Patent to Skiffington No. 464946, of December 8th, 1891, although it is also available for use in other connections.

The object of my invention is to provide the expansible member of the valve with a projection adapted to bear against a shoulder of the valve casing, the expansible member being free to expand or contract, according to the temperature to which it is subjected, without being injured.

Another object of my invention is to provide means for sealing the valve, whereby if the valve is disturbed after it has once been regulated, that fact can be easily ascertained.

My invention is fully illustrated in the accompanying drawings, in which

Figure 1:
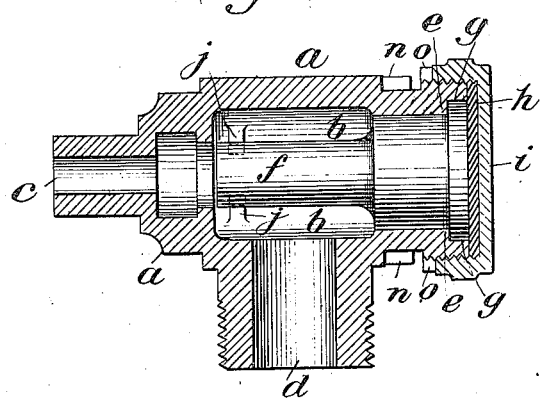
Figure 5:
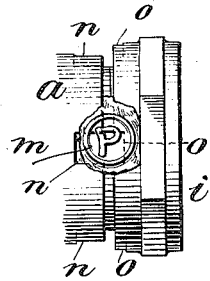
Figure 2:
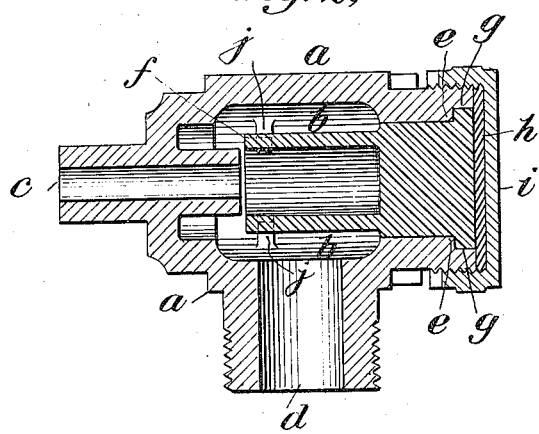

Figure 1 is a sectional view thereof; Fig. 2 is a similar view of a modification in which the expanding member is made hollow and expands around the inlet pipe; Figs. 3 and 4 are sectional views of other modifications; and Fig. 5 shows my sealing device.

Referring to the drawings, $a$ is the valve casing or wall, provided with the valve chamber $b$ and with the inlet opening $c$ and an outlet opening $d$. The valve casing may be made of any suitable metal or other material. The valve chamber is preferably made of such a shape that the substance passing through the valve will have free and extended contact with the expansible member. The valve casing is also provided with the shoulder $e$, adapted to receive and hold in place the expansible member.

$f$ is the expansible member. The material of which this member is made may be greatly varied, but I prefer to make it of a vulcanized rubber composition. This member is provided with a projection $g$, adapted to bear against the shoulder $e$. The projecting portion $g$ of the expansible member is made to fit nicely the interior of the valve casing. I prefer to regulate the position of the expansible member in the valve casing in the manner shown and described and without employing a screw thread, since in the latter case the valve becomes adjustable and it has been found in practice that a great deal of difficulty arises from the valve's being changed or disturbed by the user or some one who does not understand its construction. The expansible member may however be fastened to the casing by means of a screw threaded joint.

$h$ is a washer or packing and $i$ is a cap adapted to be screwed upon the casing and to hold the expansible member in its proper place.

$j\ j$ are guides projecting from the casing adapted to keep the expansible member in place and cause it to expand in the proper direction. There may be three or four of these guides or whatever number may be found desirable.

The valve is provided with a suitable nipple at the inlet opening to enable it to be attached to a radiator or any device with which it is to be used, and the outlet or discharge pipe is similarly adapted for attachment, if desirable, to an escape pipe.

In the form shown in Fig. 1 the expansible member is provided with a suitable projection $g$ engaging the shoulder $e$ and is so arranged with reference to the inlet opening that when it is exposed to a sufficiently high temperature it will expand into and along the inlet opening, thus closing the same. If the valve is exposed to just the necessary amount of heat it will enter the inlet opening far enough to close the same and will then expand no further. If for any reason the temperature is increased beyond this point, the expansible member will expand freely along or through the inlet pipe or opening and its expansion will not be hindered or prevented by the wall of the valve. The inlet pipe or opening is made sufficiently large or wide to receive the expanding member, and for such a distance that even if the member expands to its utmost capacity it will not be forced against a seat or against the wall of the casing. In the ordinary thermostatic valves as heretofore made the expansible members have been so arranged that if they were subjected to a higher degree of heat than was necessary to close the valve, the expansible member would be forced against the valve seat or the wall of the casing, and its further expansion being thus made impossible, it would be distorted or its molecular condition would be altered or impaired and when it was cooled again it would no longer be in a condition to operate satisfactorily. When subjected to the temperature for which the valve was adapted it would not close entirely. This has been a serious defect in such valves. This defect is entirely overcome by my invention.

It is evident that as the expansive member is adapted to expand freely throughout its movement along the inlet pipe or the conduit for the fluid, it operates to accurately and reliably graduate the flow of the fluid therethrough according to the temperature of the fluid. This is due to the fact that should the temperature rise beyond the point which is sufficient to close the valve, the expansive member will expand freely along the inlet pipe or conduit for the fluid, without any such distortion as is referred to above. When the temperature falls the member will contract accordingly, and thereafter it will open and close more or less according to the temperature conditions, and thus produce the accurate and reliable graduation of the flow of the fluid. In other words, the valve is so constructed that should the normal extremes of temperature be exceeded, the valve will not thereby be injured but will continue thereafter to work as reliably as before.

In the form shown in Fig. 2 the expansible member is provided with a projection $g$ adapted to coöperate with the shoulder $e$ and is made hollow and of such a size as to inclose the inner end of the pipe when it is expanded. The operation is substantially the same.

In Fig. 3 a modification of my invention is shown, in which the expansible member is provided with the projection $g$ adapted to coöperate with the shoulder $e$ and at all times extends some distance into the inlet pipe or opening, whereby it is accurately and effectively guided. It is provided with a recess $k$ at its inner end and with openings or apertures $l\ l$ passing through the wall of the expansible member adapted to connect the recess with the valve chamber when the valve is open.

When the expansible member is cold the openings $l\ l$ connect the recess with the valve chamber, but when the expansible member is sufficiently heated it is expanded and these openings are forced past the end of the inlet pipe and are thus shut off and the valve thereby closed. If at any time these openings become clogged up, the expansible member can easily be removed and the openings cleaned.

In the form shown in Fig. 4 the outlet opening or passage $d$ is made to pass through the center of the expansible member, the member being provided with the projection $g$ adapted to coöperate with the shoulder $e$. When this member is expanded this opening is shut off. When it is contracted the opening is again connected with the valve chamber.

In all the forms shown the extension of the valve chamber beyond the valve seat is continued for such a distance that, even if the expansible member expands to its utmost capacity it will not be forced against a seat or against the wall of the casing.

$m$ is a seal. The particular form of this seal may be greatly varied. In the form shown the valve casing is provided with projections $n$ forming recesses between them, and the cap $i$ is provided with recesses or notches $o$. Sealing wax or some suitable material is placed upon the valve so as to extend into the recesses between the projections $n$ and also into the recesses $o$. If the cap is turned or removed this sealing material will be broken and will indicate that the valve has been disturbed. Thermostatic valves are necessarily delicate in their operation and the expansible members need to be carefully and nicely adjusted. Trouble frequently arises by reason of these valves being interfered with or changed by persons who are not competent to manipulate them. It is important therefore that some means should be provided for preventing them from being changed or improperly adjusted, or at least for indicating whenever this has been done, so that the manufacturer or constructor may not be responsible for the interference of other people.

My improved valve is positive and reliable in its operation and by reason of the fact that it is permitted to expand and contract to any extent according to the temperature employed it is not liable to be injured by over expansion. It is therefore durable and hence economical. It is adapted for use with all temperatures and does not have to be constructed with special reference to some particular temperature. It is simple and economical in its construction. It operates to graduate the flow of the steam or other fluid therethrough.

Having thus fully described my invention, what I claim as new and desire to secure by Letters Patent is:—

1. A thermostatic valve consisting of a valve casing provided with a valve chamber having inlet and outlet ports and an expansible member adapted to close one of the ports, a cap to secure the expansible member in place, bearing shoulders on the valve casing and cap, and a seal adapted to bear against the bearing shoulders of the casing and cap for the purpose of showing whether the valve has been disturbed, substantially as set forth.

2. A thermostatic valve, consisting of a valve casing $a$, provided with a valve chamber having an inlet port $c$ and an outlet port $d$, and a shoulder $e$, and an expansible member adapted to expand and close one of the ports and to continue to expand freely thereafter and provided with the projection $g$ to bear against the shoulder, and suitable means for holding the expansible member in place, substantially as described.

3. A thermostatic valve, consisting of a valve casing provided with a valve chamber having inlet and outlet ports and an expansible member adapted to close one of the ports, the cap $i$ to secure the expansible member in place, projections $n$ on the valve casing and the recesses $o$ in the cap, and the seal $m$, substantially as set forth.

4. A thermostatic valve, consisting of the valve casing $a$, provided with a valve chamber having an inlet port $c$ and an outlet port $d$ and a shoulder $e$, and the expansible member $f$, extending into the inlet port and adapted to expand along the same and provided with the projection $g$ to bear against the shoulder $e$, and provided with the openings $l\,l$ adapted to be closed when the member expands and the recess $k$ in the expansible member, substantially as described.

In testimony whereof, I have signed my name to this specification, in the presence of two subscribing witnesses.

ANDREW G. PAUL.

Witnesses:
NICHOLAS N. GOODLETT, Jr.,
EDWIN SEGER.